Feb. 5, 1957 R. H. ROSENBERG 2,780,501
SEAT SLIDE
Filed Feb. 9, 1952 2 Sheets-Sheet 2
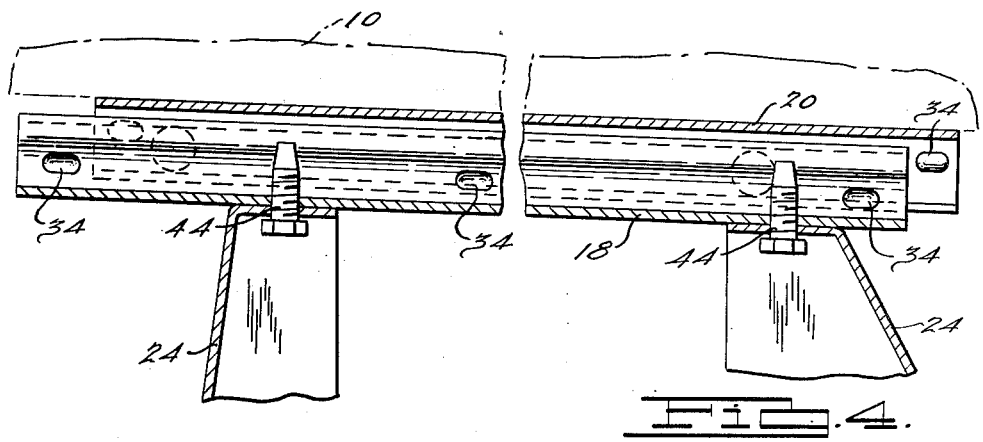
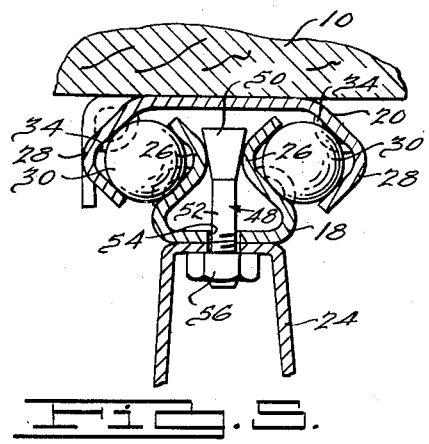
INVENTOR.
Ralph H. Rosenberg.
BY
Harness, Dickey & Pierce
ATTORNEYS.

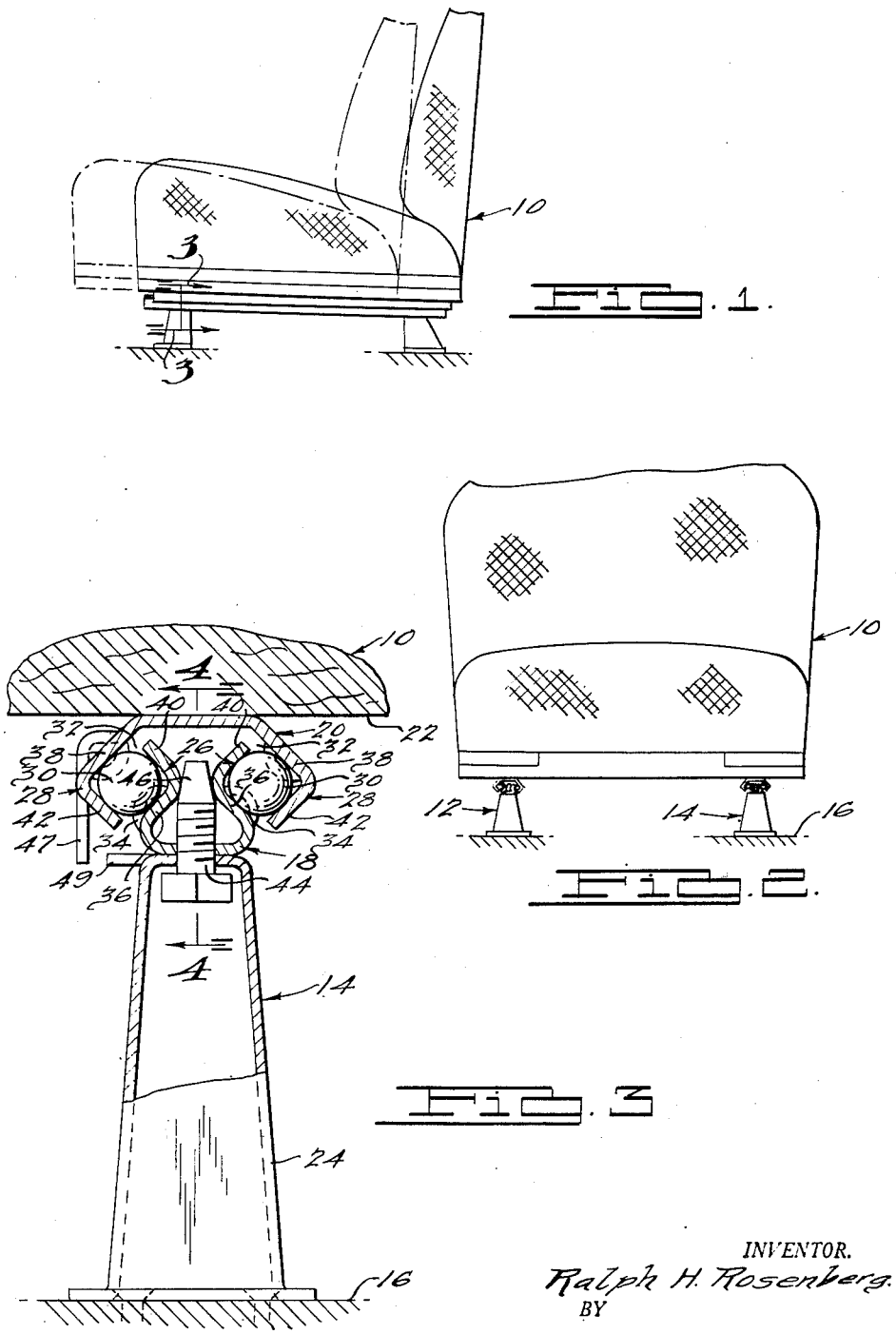

United States Patent Office 2,780,501
Patented Feb. 5, 1957

2,780,501

SEAT SLIDE

Ralph H. Rosenberg, Detroit, Mich., assignor to Ainsworth Manufacturing Corporation, Detroit, Mich., a corporation of Michigan Application February 9, 1952, Serial No. 270,806

9 Claims. (Cl. 308—6)

This invention relates broadly to new and useful improvements in slidable mountings and more particularly to a seat-slide construction for automotive vehicles and the like.

It is conventional to make the front seat of an automobile adjustable so that the operator can position the seat for maximum convenience in operation of the vehicle.

In conventional automobile construction the usual practice is to mount a seat slide under each end of the seat. In use, the seat often is adjusted by the driver only so that force used in shifting the seat is applied from only one end thereof. As a consequence, there is a tendency to cock or jam the seat during adjustment.

It is essential that the slides be constructed to resist the cocking action, and the slide must operate smoothly and easily at all times under all conditions of adjustment. Also, in a highly competitive field, such as the one to which this invention relates, it is essential as a practical matter that the slides be relatively inexpensive to manufacture. To this end it is desirable that slides be susceptible of manufacture from sheet metal by conventional rolling and forming operations.

A variety of seat slides have been devised heretofore, and most of the slides that have come into common use are fabricated from sheet metal. Usually each slide is equipped with two races, as this construction provides the smoothest operation and best obviates any tendency for the slides to cock or jam in use.

While seat slides of the above-mentioned character have been generally satisfactory, some trouble has been experienced with the antifriction balls falling out of the races due to flexure of the sheet metal from which the slides are made during adjustment of the seat. In devices of this type the parts are not held to close manufacturing tolerances, and in some instances the raceways do not properly confine the antifriction balls. It sometimes happens that there is sufficient looseness of the parts so that a sudden or unusually severe and quickly applied thrust, particularly from one end of the seat, may flex the parts sufficiently so that the antifriction balls fall out of the ways notwithstanding that the slides initially appear to operate satisfactorily and pass the usual inspection tests.

The instant invention is a novel seat-slide construction which is susceptible of manufacture from sheet metal and which is uniquely constructed to overcome the deficiencies pointed out specifically above.

In the drawings forming a part of this specification and wherein like numerals are employed to designate like parts throughout the same:

Fig. 1 is an end elevational view showing an automobile seat mounted on and supported by seat slides embodying the invention;

Fig. 2 is a front elevational view of the same;

Fig. 3 is an enlarged, vertical, sectional view taken on the line 3—3 of Fig. 1;

Fig. 4 is a fragmentary, vertical sectional view taken on the line 4—4 of Fig. 3;

Fig. 5 is a fragmentary view similar to Fig. 3 but showing a modified form of the invention.

Figs. 1 and 2 illustrate a conventional automobile seat 10 mounted on seat slides 12 and 14 embodying the present invention. The seat slides 12 and 14 are disposed one at each end of the seat and they hold the latter raised above the floor 16 of the vehicle. The two seat slides 12 and 14 are identical and a detailed description of only one, therefore, is given.

Attention is now directed to Figs. 3 and 4 which show detailed structure of the seat slide. Basically, the slide comprises a lower channel-shaped member 18 adapted for attachment to the floor 16 of the vehicle and an upper inverted channel-shaped member 20 adapted for attachment to the bottom 22 of the seat 10. As suggested, it is conventional to raise the seat 10 substantially above the floor of the vehicle and to this end the lower channel-shaped member 18 is mounted on upright columns or supports 24. The lower member 18 is sufficiently long to extend substantially the full width of the seat 10, and a support 24 is provided adjacent each end thereof. The upper member 20 preferably is substantially the same length as the lower member 18 so that it also extends substantially the full width of the seat 10.

According to the present invention, the lower member 18 is relatively narrow, and the side flanges thereof extend upwardly in slightly spaced relation between the depending flanges of the upper member 20. The latter member 20 of course is relatively wider than the lower member 18 in order that the parts interfit as shown in Fig. 3. It will be observed in this connection that the depending flanges of the upper member 20 overlap the upwardly extending flanges of lower member 18. This arrangement provides two flanges at each side of the slide, one flange belonging to the bottom member 18 and the other flange belonging to the upper member 20. The two flanges at each side of the slide are formed with complementary races 26 and 28 which receive antifriction balls 30. Stated differently, the flanges of inner member 18 are formed to define outwardly presented races 26 and the flanges of upper member 20 are formed to provide complemental, inwardly presented races 28. Races 26 and 28 define raceways 32 therebetween and the antifriction balls 30 are disposed to operate in these raceways.

Suitable means are provided for confining the antifriction balls 30 in the raceways 32 and for limiting fore-and-aft movement of the seat 10. In the form of the invention shown, the confining means comprises indentations 34 pressed from the races 26 and 28. As perhaps best shown in Fig. 4, an indentation 34 is provided at each end and in the middle of each race 26 and 28 and two antifriction balls 30 are provided in each raceway 32, one on each side of the middle indentation 34. It will be apparent in this connection that the spacing between indentations 34 determines the amount of seat travel.

From the above it will be readily apparent that the lower inclined portions 36 of the inner races 26 support the antifriction balls 30 and the upper inclined portions 38 of the outer races 28 bear downwardly on the balls. The upper inclined portions 40 of the inner races 26 prevent the antifriction balls 30 from being pushed upwardly into the slide, and the lower inclined portions 42 of the outer races 28 prevent the balls 30 from falling downwardly out of the raceways 32. Manifestly, the full weight of the seat 10, as well as the full weight of any person or object on the seat, is imposed on and supported by the antifriction balls 30. Moreover, the weight is imposed on the balls 30 and transferred through the balls to the inner races 26 in such a way that there is a tendency to separate the two races of each raceway 32.

In order to prevent the raceways 32 from opening sufficiently to permit the antifriction balls 30 to drop out, pressure screws 44 are threaded into the lower channel members adjacent the ends of the slide. The screws 44 extend upwardly between the flanges of the lower member 18 and have tapered terminal portions 46 which engage the two inner races 26. Two screws 44 are here shown, although any desired number can be provided. Also, the screws 44 may be positioned at any desired points along the length of the slide. In general, however, the screws preferably are positioned coincident with the supports 24, as this arrangement provides a double thickness of metal for engagement with the threads of each screw.

In use, the pressure screws 44 are tightened to spread the inner races 26 sufficiently so that both the inner and the outer races 26 and 28 and the antifriction balls 30 are maintained in contact with each other, thus eliminating any sloppiness that may exist between the manufactured parts and assuring smooth, even operation of the slide at all times. Manifestly, any variations in the size or form of the parts due to permissible manufacturing tolerances are compensated automatically by the pressure screws 44. Also, the physical presence of the screws 44 between the inner races 26 is efficacious under normal conditions of usage and abuse to prevent spreading of the two races forming each of the raceways 32.

Any suitable or conventional means may be employed to latch or hold the slide in a selected, adjusted position within the operating range thereof. The latch construction shown in the copending application of Albert T. Potter, Serial No. 156,137, filed April 15, 1950, which issued as United States Patent No. 2,702,582, is a typical example of mechanism suitable for this purpose. However, as these means do not comprise any part of the instant invention, no specific latching structure is shown. In the drawings, the upper slide member 20 is formed with a vertical flange portion 47 adapted to mount a suitable latch element (not shown) which coacts with a keeper plate 49 extending outwardly from one of the supports 24 to hold the upper slide member 20 fixed with respect to the lower member 18 and in a selected, longitudinally adjusted position.

Attention is now directed to Fig. 5 which is identical to the form of the invention first described except that a different type of pressure screw is employed. In the interest of clarity and simplicity of description, the same reference characters are employed to designate corresponding identical parts of the two structures, and a detailed description is given only of the novel structure.

In this form of the invention a pair of pressure screws 48 are provided in place of the two screws 44. Each screw 48 has a wedge-shaped head 50, and the heads are arranged above the inner races 26 with the downwardly tapered sides thereof in engagement with the races. Threaded shanks 52 extend downwardly from the heads 50 and through holes 54 provided centrally in the member 18 and support 24. Nuts 56 on the projecting ends of the shanks 52 can be tightened to pull the tapered heads 50 solidly against races 26.

Manifestly, the arrangement here under consideration accomplishes the same ends in substantially the same way as the form of the invention first described.

Having thus described the invention, I claim:

1. A slide for automobile seats and the like comprising a pair of superposed, elongated, relatively slidable members, one adapted for attachment to the floor of a vehicle and the other adaptable for attachment to the vehicle seat, each of said members having a pair of race-forming flanges at opposite sides thereof, and corresponding flanges of the members being disposed in overlapping relation, said corresponding flanges having laterally directed, opposed, longitudinally extending corrugations defining raceways therebetween and at least one flange of each raceway being laterally flexible, antifriction balls in said raceways, the corrugation in one of the two flanges defining each raceway having a portion thereof arranged to support said balls and the corrugation in the other of the two flanges having a portion arranged to bear downwardly on the balls, and pressure-applying elements in engagement with said flexible flanges flexing the same in the direction of the other of said flanges to regulate the width of said raceways and to maintain contacting pressure between said balls and said raceways.

2. The combination as set forth in claim 1 wherein said pressure-applying elements are in the form of screws having tapered portions positioned to engage said flexible flanges.

3. The combination as set forth in claim 1 wherein said flexible flanges have inclined portions and wherein said pressure-applying elements engage said inclined portions to flex the flanges.

4. The combination as set forth in claim 1 wherein said flexible flanges are disposed at the inner sides of the races and wherein said pressure-applying elements are disposed between and are in engagement with both of said flexible flanges so that each element applies pressure simultaneously and equally on the two flanges to flex the same.

5. The combination as set forth in claim 4 wherein said pressure-applying elements are in the form of screws having a tapered portion engaging and mutually co-operating with said flexible flanges and spreading the same apart in the direction of the other of said flanges.

6. A slide for automobile seats and the like comprising a pair of superposed, elongated, relatively slidable members, one adapted for attachment to the floor of a vehicle and the other adapted for attachment to the vehicle seat, each of said members having a pair of race-forming flanges at opposite sides thereof and corresponding flanges of the members being disposed in overlapping relation, said corresponding flanges having opposed, laterally facing, longitudinally extending corrugations therein defining raceways therebetween, the two flanges of one member being disposed at the inner sides of the raceways and both of said inner flanges being laterally flexible, antifriction balls in said raceways, the corrugation in one of the two flanges defining each raceway having an inclined portion arranged to support said balls and the corrugation in the other of the flanges having an inclined portion arranged to bear downwardly on the balls, and adjusting screws carried by one of said members having tapered portions in pressed engagement with the inclined portions of both flexible flanges, whereby adjustment of said screws regulates the width of the raceways.

7. A slide for automobile seats and the like comprising a pair of superposed, elongated, relatively slidable members, one adapted for attachment to the floor of a vehicle and the other adapted for attachment to the vehicle seat, each of said members having a pair of race-forming flanges at opposite sides thereof and corresponding flanges of the members being disposed in overlapping relation, said corresponding flanges having opposed, laterally facing, longitudinally extending corrugations therein defining raceways therebetween, the two flanges of one member being disposed at the inner sides of the raceways and both of said inner flanges being laterally flexible, antifriction balls in said raceways, the corrugations in the two inner flanges having inclined portions arranged to support said balls and the inclined portions being disposed side by side in upwardly convergent relation, the corrugation in the other of said flanges having portions arranged to bear downwardly on the balls, and adjusting screws threaded into the lowermost member between the flexible flange portions thereof, said screws having tapered portions engaging the inclined portions of said flexible flanges whereby adjustment of the screw regulates the pressure exerted thereby against the flexible flanges to control the width of said raceways.

8. A seat slide comprising a lower, elongated, channel-shaped member adapted for attachment to the floor of a vehicle and having upstanding side flanges at opposite side of the slide, an upper, inverted, channel-shaped member adapted for attachment to a vehicle seat and having depending flanges overlapping and spaced laterally from the flanges of said lower channel member, the two flanges of said channel members at each side of the slide having opposed, laterally facing, longitudinally extending corrugations therein defining a raceway therebetween, antifriction balls in said raceways supporting said upper channel member, and pressure screws carried by one of said channel members having tapered surfaces engaging the flanges defining the inner races of the raceways and adjustable to vary the pressure against and to flex said flanges to regulate the width of said raceways.

9. A seat slide comprising a lower channel-shaped member having upstanding flanges at opposite sides of the slide, an upper, inverted, channel-shaped member having depending side flanges disposed outwardly of, overlapping, and spaced laterally from the flanges of said lower channel-shaped member, corresponding flanges of said channel-shaped members having complemental races therein defining a raceway therebetween, antifriction balls in said raceways supporting the upper channel-shaped member on said lower channel-shaped member, and pressure screws carried by said lower channel-shaped member extending upwardly between the side flanges of said lower channel-shaped member and formed with tapered surfaces engaging the race portions of said flanges, said screws being adjustable and exerting pressure against the flanges engaged thereby tending to spread the flanges and to maintain said races pressed against said antifriction balls.

References Cited in the file of this patent

UNITED STATES PATENTS

| | | |
|---|---|---|
| 1,106,992 | Thomas | Aug. 11, 1914 |
| 2,195,349 | Woina | Mar. 26, 1940 |
| 2,417,523 | Simpson | Mar. 18, 1947 |